United States Patent
Xue et al.

(10) Patent No.: US 9,348,563 B1
(45) Date of Patent: May 24, 2016

(54) BI-DIRECTIONAL EDITING BETWEEN VISUAL SCREEN DESIGNER AND SOURCE CODE

(71) Applicants: Yunjiao Xue, Waterloo (CA); David Brandow, Guelph (CA)

(72) Inventors: Yunjiao Xue, Waterloo (CA); David Brandow, Guelph (CA)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/566,537

(22) Filed: Dec. 10, 2014

(51) Int. Cl.
  *G06F 9/44* (2006.01)
(52) U.S. Cl.
  CPC ........................................ *G06F 8/34* (2013.01)
(58) Field of Classification Search
  None
  See application file for complete search history.

(56) References Cited

U.S. PATENT DOCUMENTS

| | | | | |
|---|---|---|---|---|
| 7,370,315 B1* | 5/2008 | Lovell | ...................... | G06F 8/33 715/763 |
| 2006/0200799 A1* | 9/2006 | Wills | ........................ | G06F 8/34 717/109 |
| 2007/0028164 A1* | 2/2007 | Kawanishi | .......... | G06F 17/2247 715/207 |
| 2013/0247005 A1* | 9/2013 | Hirsch | ...................... | G06F 8/71 717/121 |
| 2014/0343696 A1* | 11/2014 | Plache | ............... | G05B 19/0426 700/83 |
| 2015/0020006 A1* | 1/2015 | Kotzer | .............. | G06F 17/30867 715/762 |
| 2015/0317288 A1* | 11/2015 | Ragan | ................. | G06F 17/3089 715/234 |

OTHER PUBLICATIONS

"Sybase Unwired Platform", internet article, Sep. 2010.*

* cited by examiner

*Primary Examiner* — Daxin Wu
(74) *Attorney, Agent, or Firm* — Schwegman Lundberg & Woessner, P.A.

(57) ABSTRACT

In an example embodiment, a change pertaining to a first element in a visual representation of a screen of a hybrid application in a screen design tool of an application development tool in an enterprise mobility platform is detected. A library of elements is accessed to retrieve a first code-generating algorithm corresponding to the first element, the first code-algorithm designed to create a first block of source code written in a scripting language that can be rendered as a user interface representation. A code preview tool of the application development tool is caused to display source code written in the scripting language, the source code displayed by the code preview tool reflecting the change pertaining to the first element by the code preview tool adding, changing, or removing the first block of source code corresponding to the first element to or from a previously displayed version of the source code.

19 Claims, 15 Drawing Sheets

BI-DIRECTIONAL EDITING BETWEEN VISUAL SCREEN DESIGNER AND SOURCE CODE

TECHNICAL FIELD

This document generally relates to methods and systems for use with computer networks. More particularly, this document relates to an extensibility framework for use with dynamic computer programming languages.

BACKGROUND

Enterprise mobility platforms manage the whole life cycle of applications for an enterprise, including application development, application deployment, application execution, application management and mobile device management. In a large corporation with tens of thousands of employees, multiple business lines, and millions of transactions daily, employees need to access data and work on their tasks while they are in different statuses. Enterprise mobility platforms enable business analysts and developers to quickly develop mobile applications with specific business objectives and functionality and deploy the applications, allowing other employees to use the applications on their devices to process data and information.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

In an example embodiment, aspects are provided that allow for bi-directional editing between a visual screen designer in an enterprise mobility platform and source code. This helps reduce the difficulty a programmer typically has in manually writing source code and viewing the effects of changes in the source code.

Figure 1:
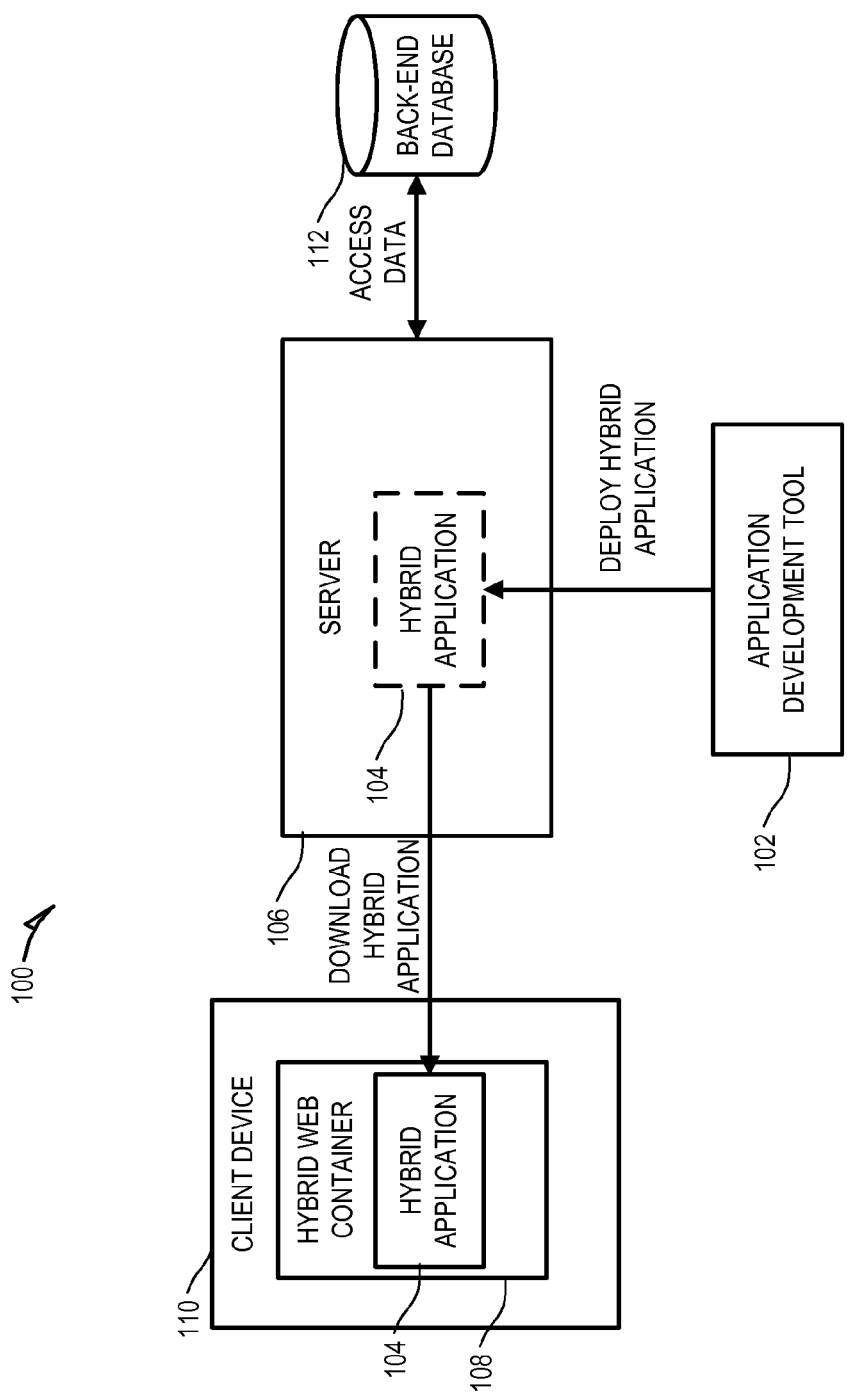
FIG. 1 is a block diagram illustrating an enterprise mobility platform system in accordance with an example embodiment.

FIG. 1 is a block diagram illustrating an enterprise mobility platform system 100 in accordance with an example embodiment. The enterprise mobility platform system 100 may include an application development tool 102, a hybrid application 104, a server 106, and a hybrid web container 108. The application development tool 102 (also sometimes known as a designer) provides a visual graphical interface to allow a programmer to develop the hybrid application 104. Once complete, the hybrid application 104 is deployed to the server 106. Then a client device 110 downloads the hybrid application 104 in the hybrid web container 108. Pictured here is a single hybrid web container 108 on a client device 110, although one of ordinary skill in the art will recognize that multiple client devices could each have their own hybrid web container 108 for a particular hybrid application 104. The hybrid web container 108 is a native mobile application that connects to the server 106 to download the appropriate hybrid application 104 and then executes it. A back-end database 112 is also provided to allow the hybrid application 104 to access shared data.

One example of an enterprise mobility platform system is Sybase Unwired Platform (SUP). In SUP, the application development tool 102 is an Eclipse-based integrated development environment (IDE) that creates one or more mobile workflow packages. A mobile workflow package is a model for screens, widgets on screens and workflows between screens. A XBW model is an implementation of a mobile workflow package that defines user interface (screens) and workflow (from screen to screen) of a hybrid application. XBW is not an acronym but rather the name applied to this type of model. The developer is able to visually design screens and workflow using drag-and-drop operations.

The hybrid application 104 may store mobile business objects (MBOs) and workflow packages. An MBO is a software object like a class in programming languages. It encapsulates business logic of a mobile application. The MBO also includes attributes that map to data in a data set. When a mobile application requests data, mobile applications use MBOs to retrieve data from the data set. The MBO is developed in the application development tool 102 and deployed to the server 106 along with the application. The MBO is bound to a data source, such as a data source in the back-end database 112.

Mobile workflow packages include web files that enable a hybrid application to execute on mobile devices having different operating platforms. These web files enable a hybrid application to execute on mobile devices having different operating platforms. Additionally, the web files can be used to create mobile applications that include extensive customization at the screen layout and data interaction.

When the server 106 receives a workflow package, it may deploy the hybrid application 104 as web files to the client device 110. On the client device 110, the web files may be installed in the hybrid web container 108.

When a client device 110 receives data from the server 106, a user may manipulate the data. After a user manipulates the data, the client device 110 may synchronize with the server 106 by returning the manipulated data to the server 106. On the server 106, the manipulated data may be stored as a data subset. The server 106 then uses the appropriate MBO to store and retrieve data from the data source (e.g., back-end database 112). When the server 106 retrieves data from the data set, it may store the data as a data subset. Periodically, the server 106 may synchronize with the data source by updating the data set with the manipulated data stored in the data subset.

A developer is able to design screens one by one in a screen design page and generate JavaScript or other source code from whatever has been designed. The JavaScript may include methods that execute business logic of a mobile application. The methods included in the JavaScript may be triggered when a user selects a link or button included in a screen or performs some other interaction with a screen of a mobile application. Additionally, the JavaScript allows a developer to include functionality that activates other features or applications native to the client device 110. A person skilled in the art will appreciate that a native application is an application that is designed to run on an operating platform the client device 110. For example, a developer may add methods to a JavaScript file to activate the camera or a calculator on a mobile device.

Figure 2:
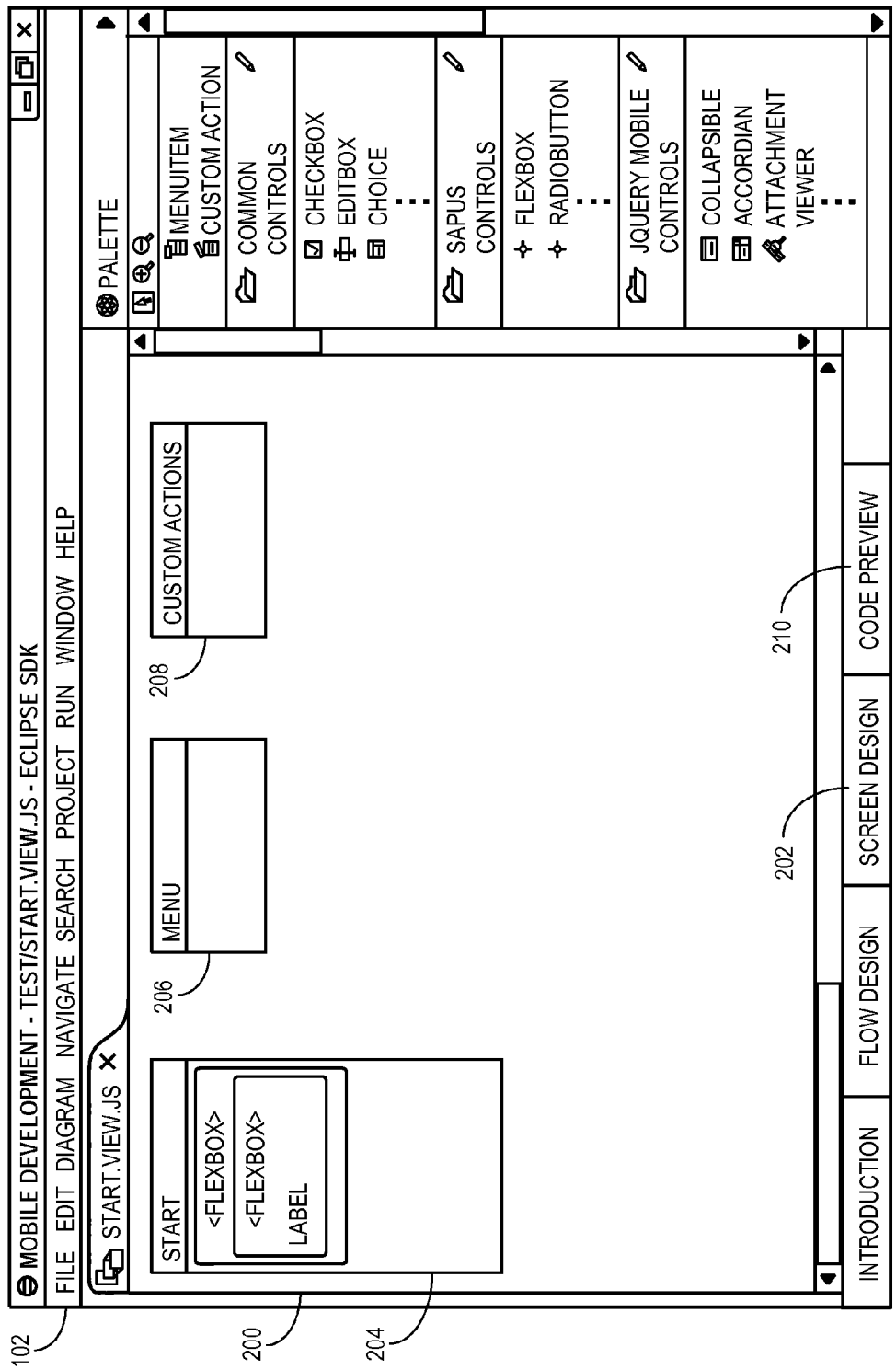
FIG. 2 is a screen capture illustrating a screen design page of an application development tool in accordance with an example embodiment.

FIG. 2 is a screen capture illustrating a screen design page 200 of an application development tool 102 in accordance with an example embodiment. The screen design page 200 is enabled by the user pressing on a screen design tab 202. Here the screen design page 200 is displaying a start screen 204 along with a menu 206 for the start screen 204 and custom actions 208 for the start screen 204. Typically, once the developer is finished visually designing the screens using the screen design page 200, he or she would generate JavaScript or other source code from whatever has been designed. While the designer could manually edit the generated JavaScript or other source code prior to deploying the hybrid application to the server 106, the manual changes would not iterate through to the mobile workflow package (e.g., XBW model) that defines the visually created screens from the screen design page 200. Hence, ordinarily the developer would be unable to go back to alter the visual design of the screens once a manual change is made to the source code.

In an example embodiment, source code is generated in a framework that deals with user interface rendering. This allows a rendered screen to be modified if the underlying source code is also modified. In such an embodiment, a developer enjoys the convenience of visually creating and editing screens using a screen design page 200 of an application development tool 102, but can also expect fine-grained control over the user interface by manually editing the source code and seeing the results of such manual edits in the screen design page 200. In one example embodiment, the source code is generated in UI5, which is a JavaScript framework that deals with UI rendering and many other tasks. Thus, in an example embodiment, the application development tool 102 is designed to allow bidirectional editing between a SUP XBW model and UI5 JavaScript source code.

Figure 3:
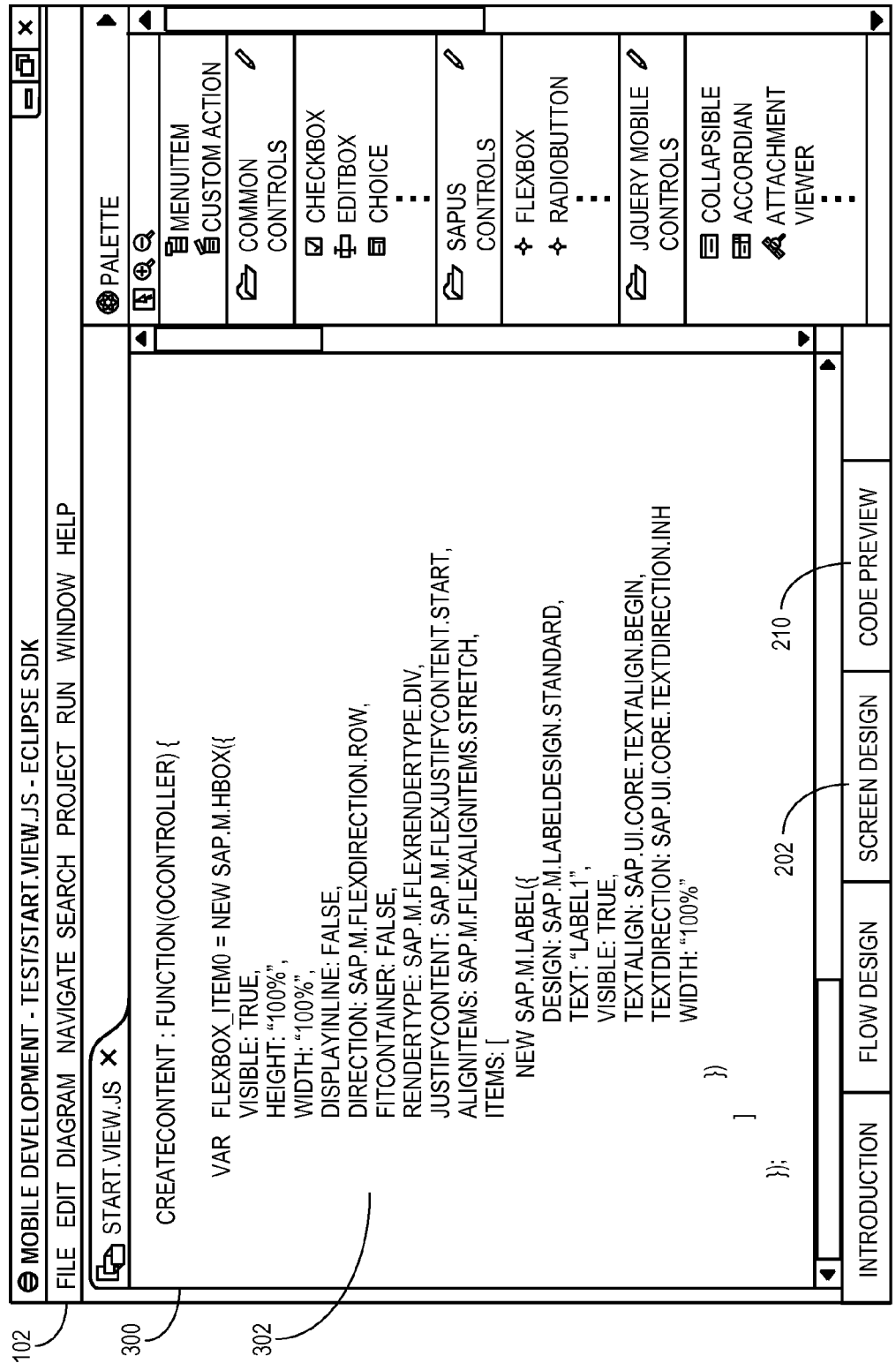
FIG. 3 is a screen capture illustrating the code preview page of an application development tool in accordance with an example embodiment.

FIGS. 3-11 (in conjunction with previously discussed FIG. 2) depict an example of bi-directional editing between a visual screen designer and source code in accordance with an example embodiment. Beginning with FIG. 3, the developer may view the source code corresponding to the visually designed start screen 204 by pressing a code preview tab 210 in the application development tool 102. FIG. 3 is a screen capture illustrating the code preview page 300 of an application development tool 102 in accordance with an example embodiment. The code 302 depicted in the code preview page 300 represents JavaScript code generated from the mobile workflow package (e.g., XBW model) from the start screen 204 that was previously designed by the developer.

Figure 4:
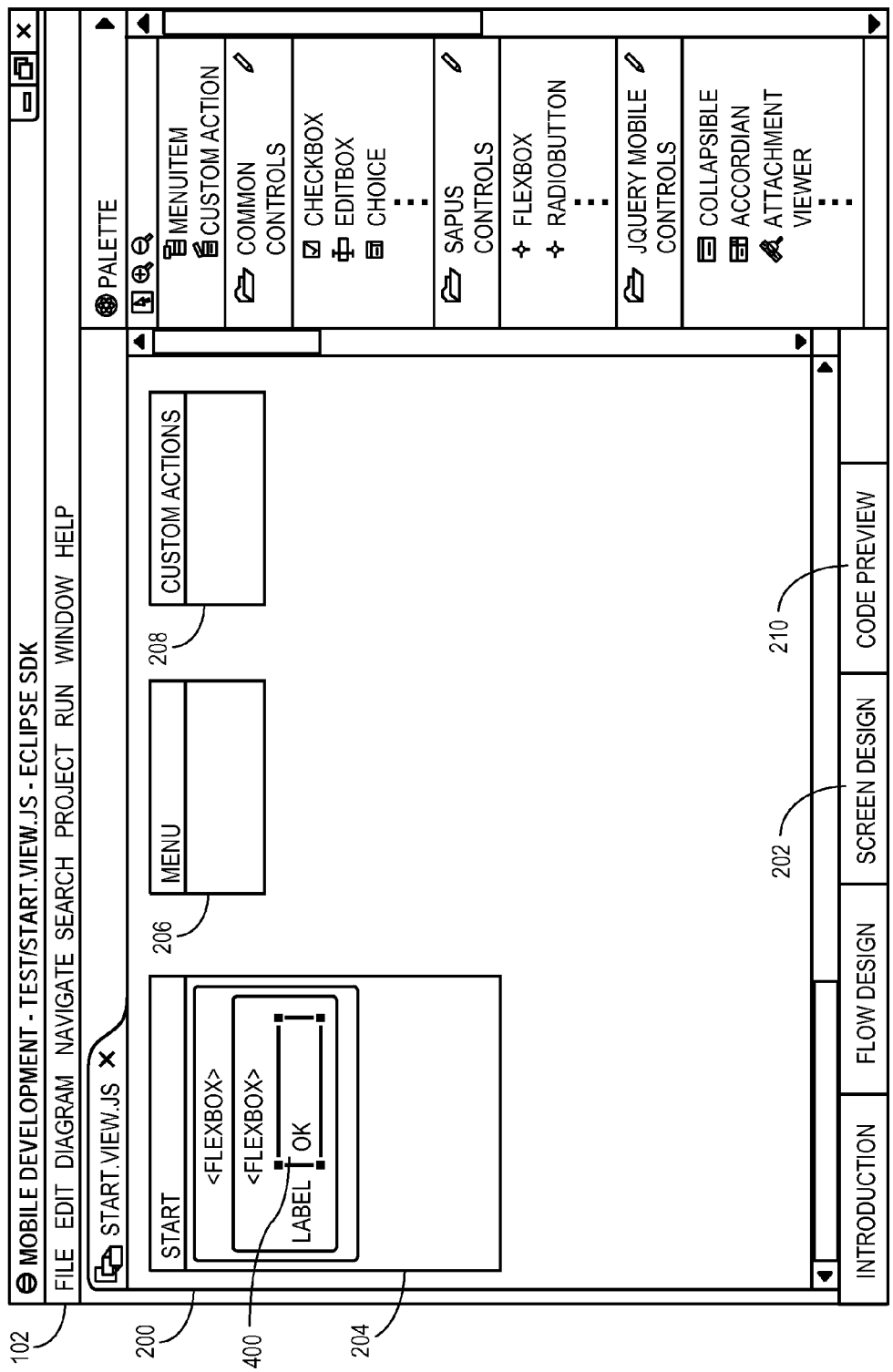
FIG. 4 is a screen capture illustrating the screen design page of an application development tool after the start screen has been edited in accordance with an example embodiment.

Assume then that the developer navigates back to the screen design page 200 by pressing the screen design tab 202 and then edits the start screen 204 using a drag and drop operation. FIG. 4 is a screen capture illustrating the screen design page 200 of an application development tool 102 after the start screen 204 has been edited in accordance with an example embodiment. Here, the developer has dragged and dropped an OK button 400 into the start screen 204.

Figure 5:
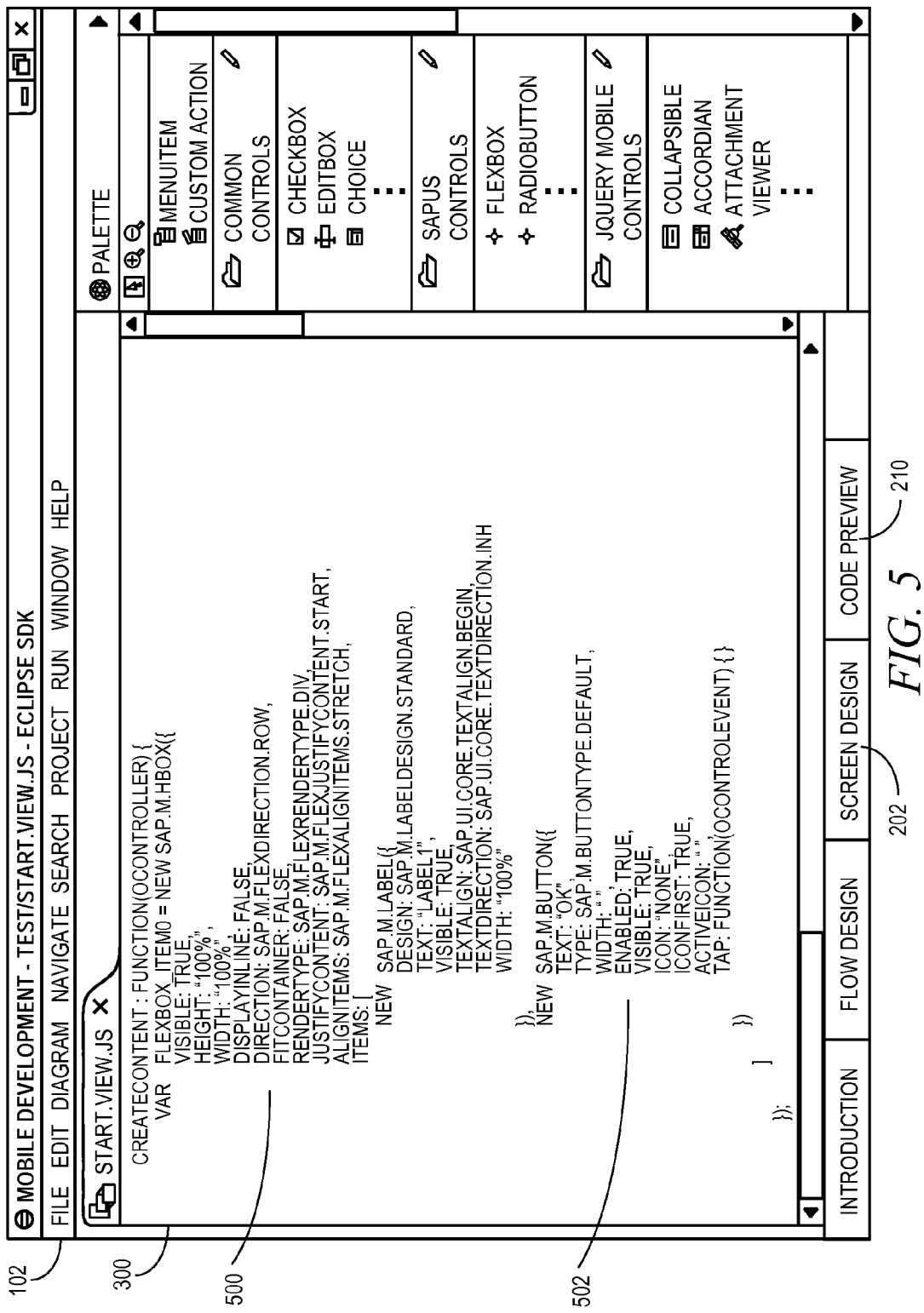
FIG. 5 is a screen capture illustrating the code preview page of an application development tool after the start screen has been edited in accordance with an example embodiment.

Assume then that the developer navigates back to the code preview page 300 by pressing the code preview tab 210 in the application development tool 102. FIG. 5 is a screen capture illustrating the code preview page 300 of an application development tool 102 after the start screen 204 has been edited in accordance with an example embodiment. As can be seen, the code 500 has been updated to include code 502 for the newly added OK button 400.

Figure 6:
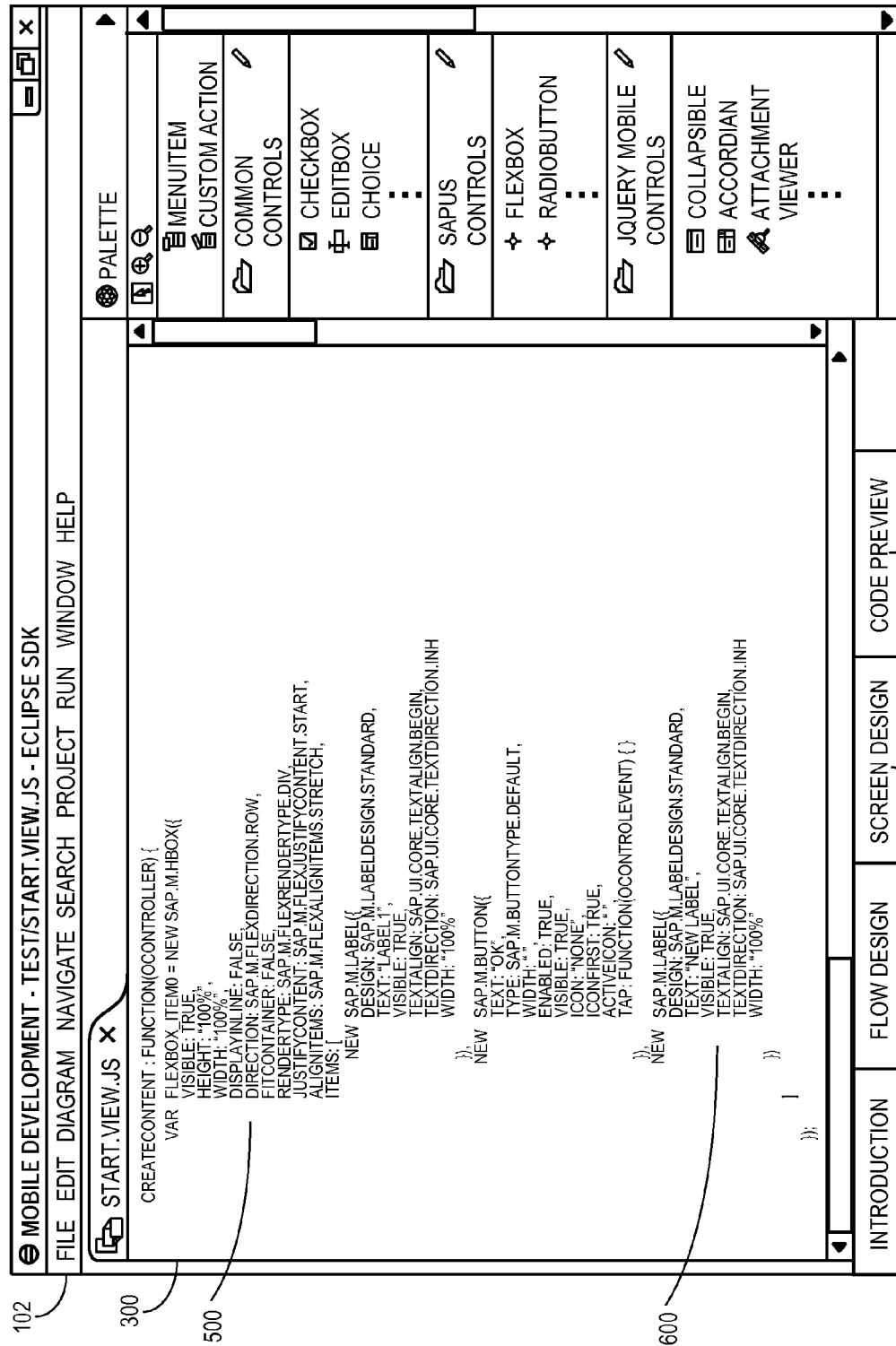
FIG. 6 is a screen capture illustrating the code preview page of an application development tool after the code has been manually edited in accordance with an example embodiment.
Figure 7:
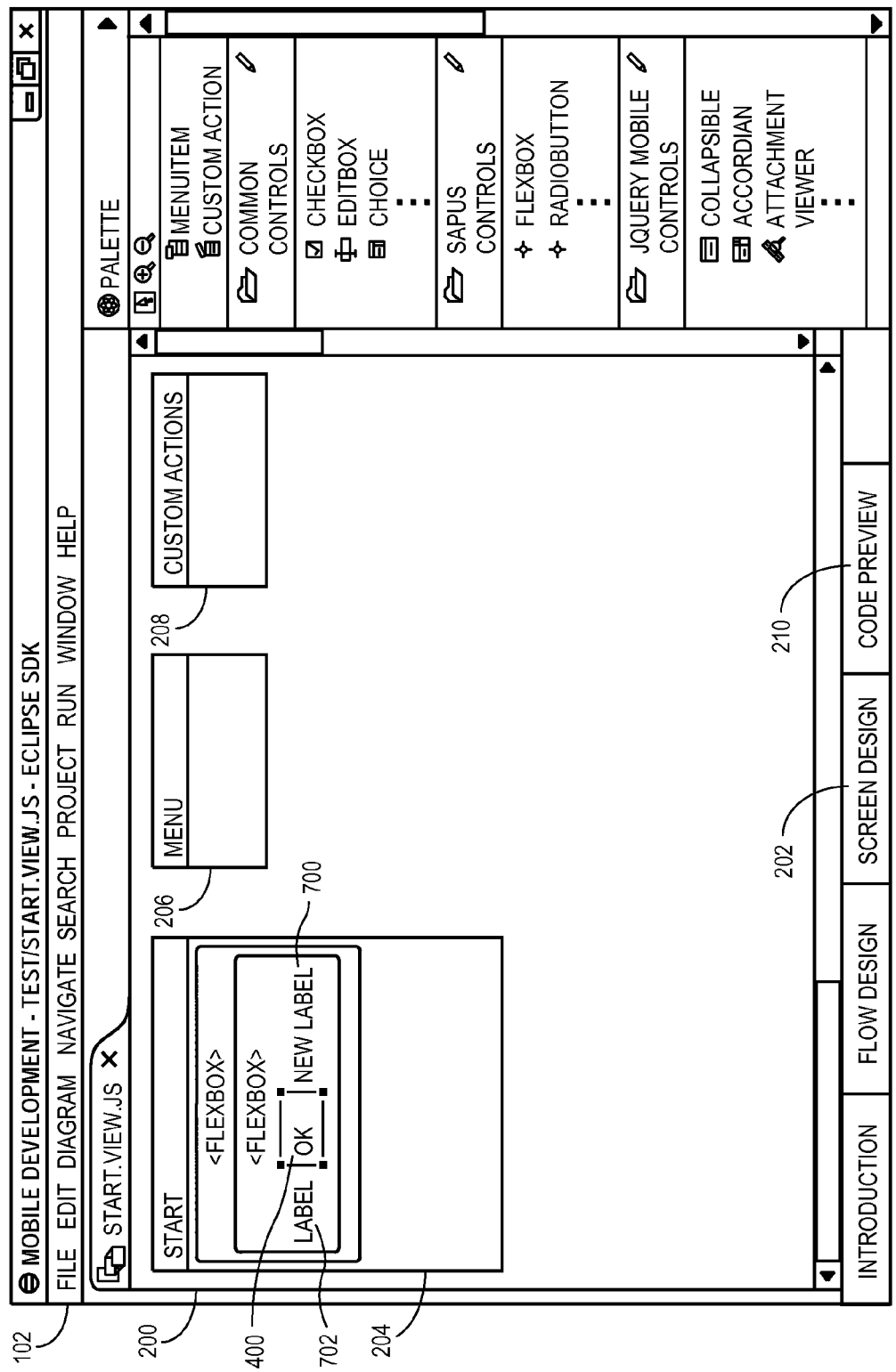
FIG. 7 is a screen capture illustrating the screen design page of an application development tool in light of the manual update of the source code in accordance with an example embodiment.

Then assume that the developer wishes to manually alter the code 500 from within the code preview page 300. FIG. 6 is a screen capture illustrating the code preview page 300 of an application development tool 102 after the code 500 has been manually edited in accordance with an example embodiment. Here, the developer has added additional code 600, which is intended to display a new label in the start screen 204. Then assume that the developer wishes to see the visual results of this code change and presses the screen design tab 202. FIG. 7 is a screen capture illustrating the screen design page 200 of an application development tool 102 in light of the manual update of the source code in accordance with an example embodiment. Here, the screen design page 200 has been updated to reflect the new label 700.

Figure 8:
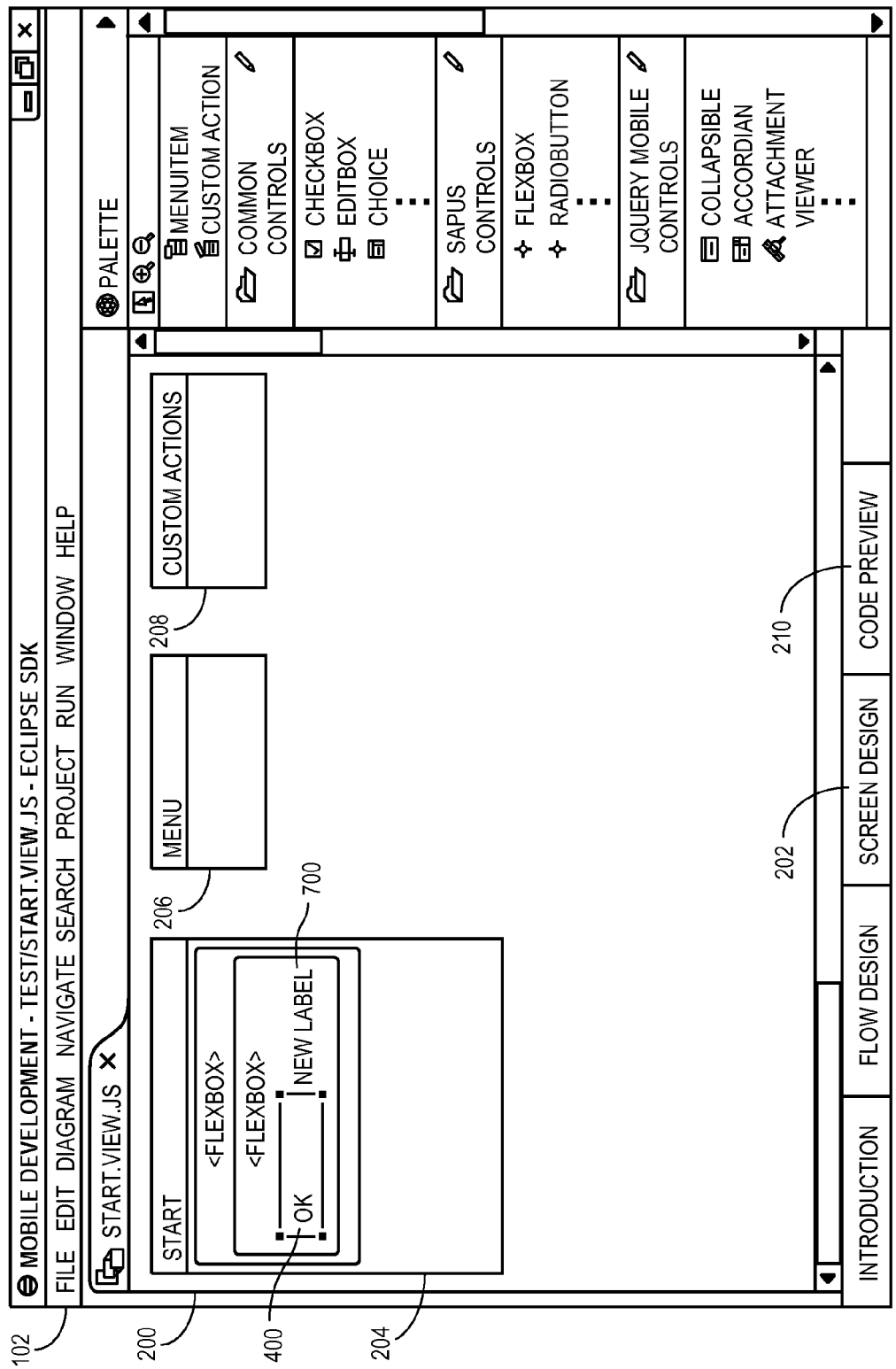
FIG. 8 is a screen capture illustrating the screen design page of an application development tool after the label has been removed.

Then assume that the developer wishes to remove label 702. The developer can then visually remove the label 702 (such as by a drag and drop operation) in the screen design page 200. FIG. 8 is a screen capture illustrating the screen design page 200 of an application development tool 102 after the label 702 has been removed. As can be seen, the start screen 204 has been updated so that OK button 400 and the new label 700 have been moved.

Figure 9:
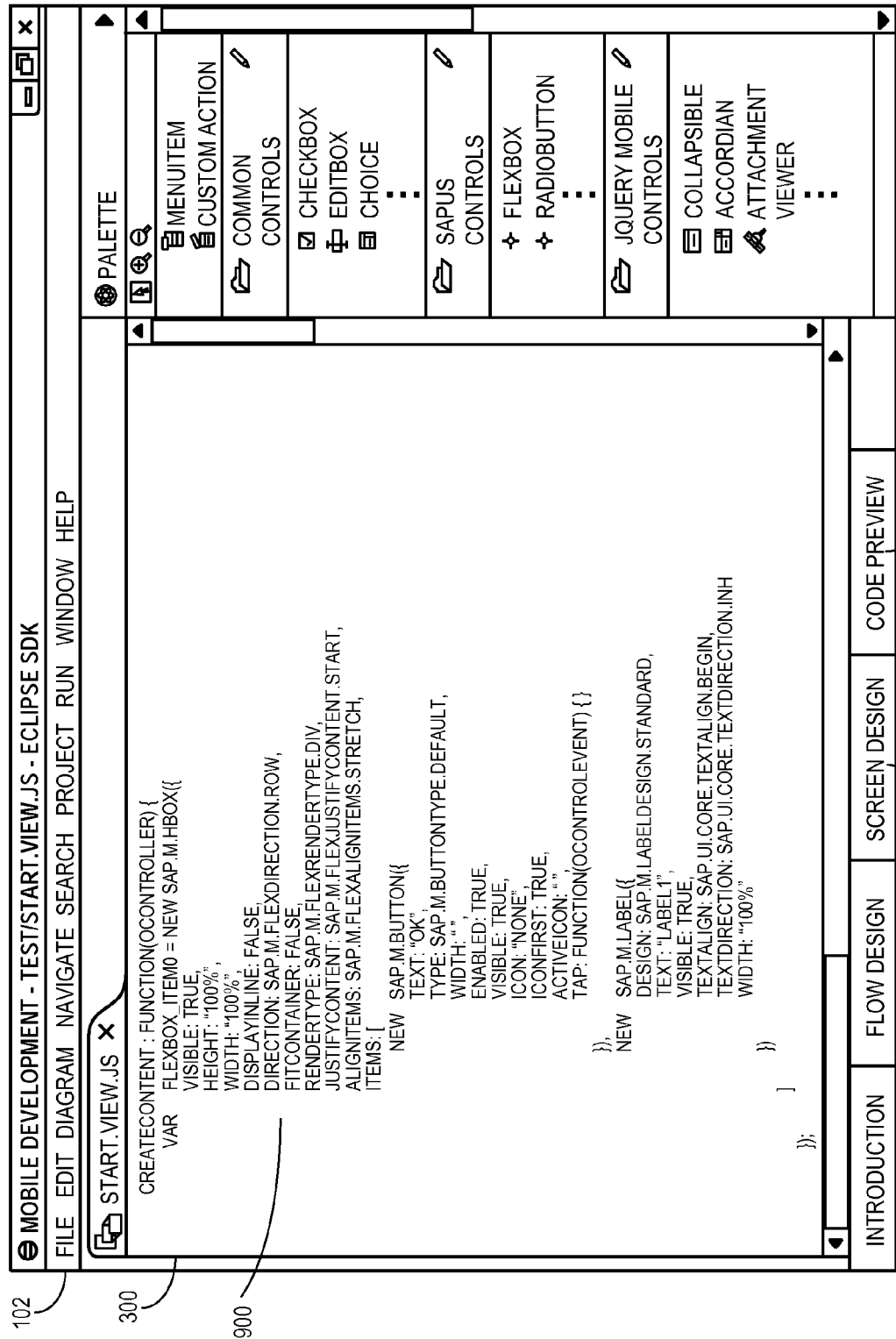
FIG. 9 is a screen capture illustrating the code preview page of an application development tool after the label has been removed.

Then assume the developer wishes to view the source code after the label 702 has been removed. FIG. 9 is a screen capture illustrating the code preview page 300 of an application development tool 102 after the label 702 has been removed. As can be seen, code 900 has been automatically altered to remove the code relating to the label 702.

Figure 10:
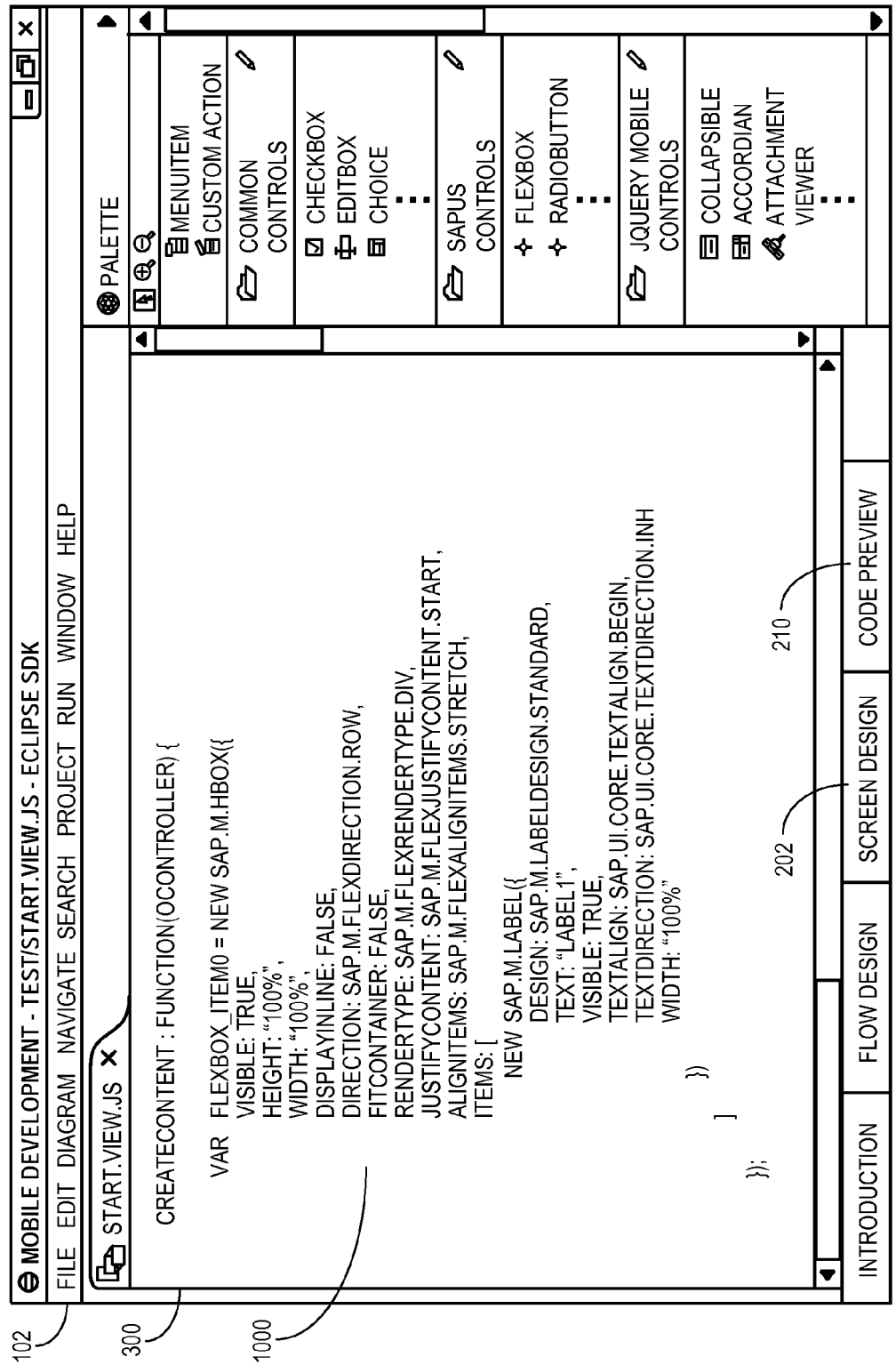
FIG. 10 is a screen capture illustrating the code preview page of an application development tool after the OK button has been removed.

Then assume the developer has changed his or her mind and wishes to remove the OK button 400. The developer can do this from the code preview page 300 by manually deleting the code corresponding to the OK button 400. FIG. 10 is a screen capture illustrating the code preview page 300 of an application development tool 102 after the OK button 400 has been removed. As can be seen, the code 1000 has been manually updated by the developer to remove code relating to the OK button 400.

Figure 11:
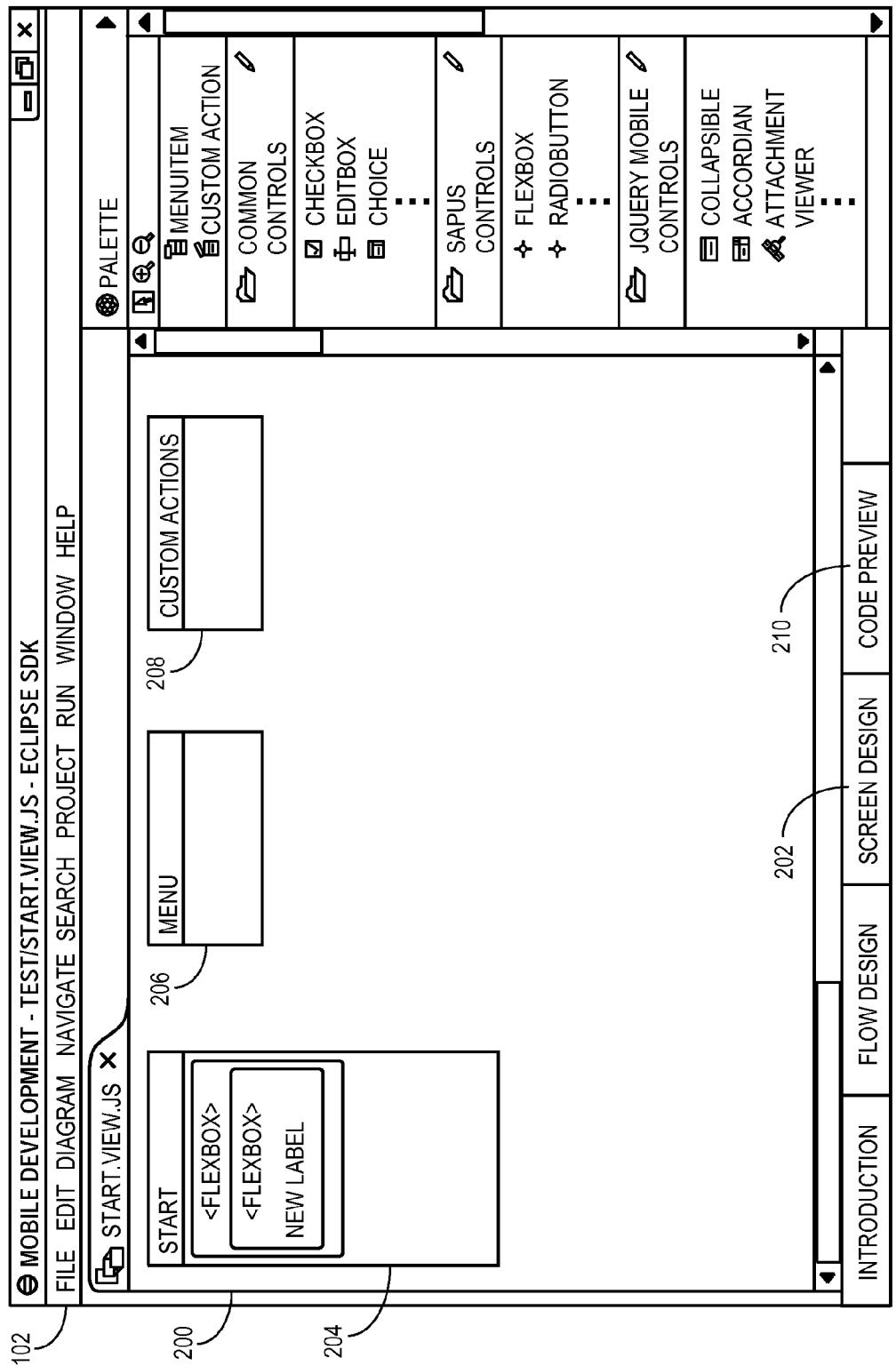
FIG. 11 is a screen capture illustrating the screen design page of an application development tool in light of the manual update of the source code to remove the OK button in accordance with an example embodiment.

Then assume that the developer wishes to view the result of the removal of the OK button 400. The developer can then again press the screen design tab 202. FIG. 11 is a screen capture illustrating the screen design page 200 of an application development tool 102 in light of the manual update of the source code to remove the OK button 400 in accordance with an example embodiment. Here the start screen 204 has been updated to reflect the changes made to the source code.

Of course, the above are only examples of the many different types of editing that can be performed in each of the screen design page 200 and the code preview page 300. Properties of the widgets in either page can also be modified, and the corresponding changes can be seen in the other page. Similar bi-directional editing can be performed to add or remove transitions between elements or screens.

Figure 12:
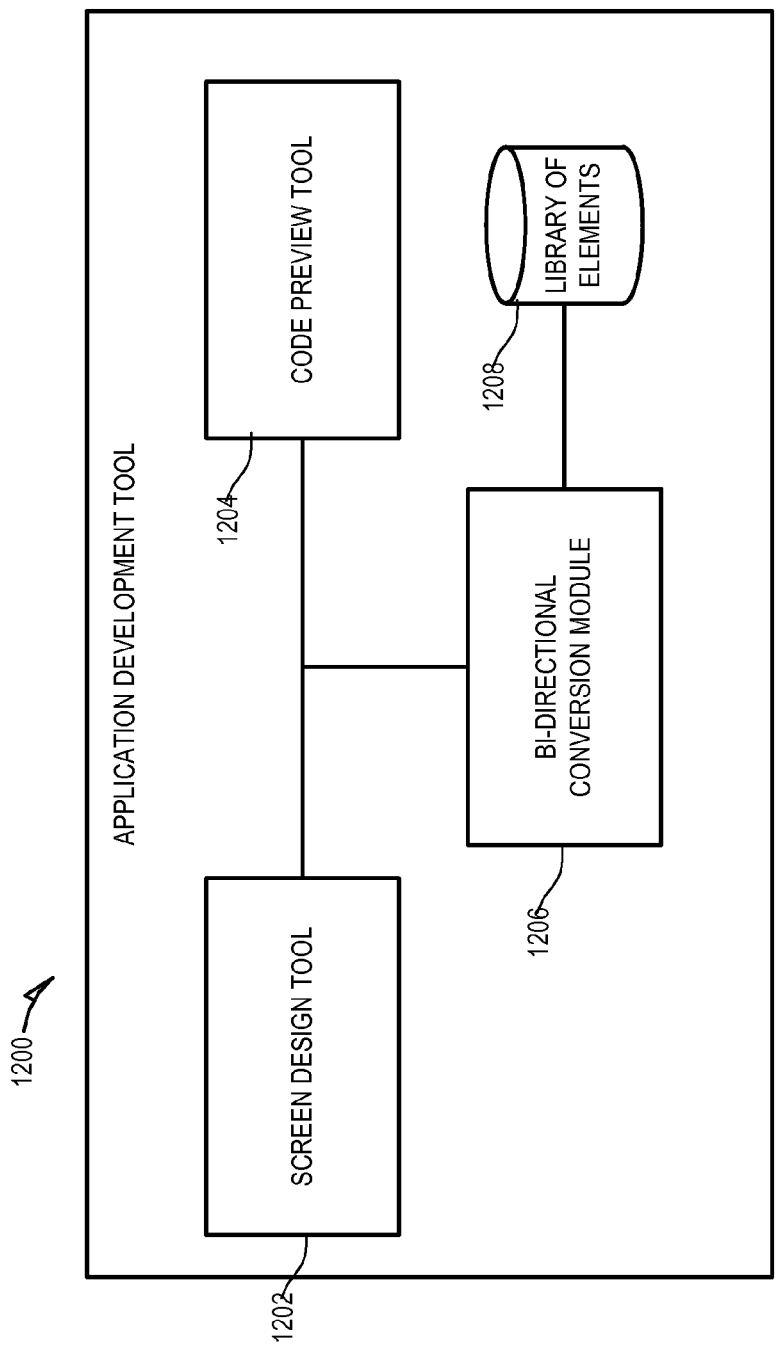
FIG. 12 is a block diagram illustrating an application development tool in accordance with an example embodiment.

FIG. 12 is a block diagram illustrating an application development tool 1200 in accordance with an example embodiment. In an example embodiment, the application development tool 1200 is the application development tool 102 of FIG. 1 in more detail. The application development tool 1200 may include a screen design tool 1202 and a code preview tool 1204. The screen design tool 1202 may present a visual interface to a user to visually edit screens of a hybrid application, such as the screen design page 200 depicted in FIGS. 2-11 above. The code preview tool 1204 may present raw source code in a screen to a user to visually edit the raw source code of the hybrid application, such as the code preview page 300 depicted in FIGS. 3-11 above. A bi-directional conversion module 1206 may detect when changes are made in either the screen design tool 1202 or the code preview tool 1204 and may convert and iterate such changes through to the other of the screen design tool 1202 or code preview tool 1204. This may be accomplished by accessing a library of elements 1208. The library of elements 1208 may contain identifications of a number of supported elements that a developer can add to a hybrid application as well as corresponding code-generating algorithm for each of those supported elements. The library of elements 1208 may also contain algorithms to update the mobile workflow package for each of the supported elements. When a change occurs in the screen design tool 1002, the bi-directional conversion module 1206 may act to convert that change to the corresponding source code. This may include identifying the screen element being altered (e.g., updated, deleted or added) and obtaining the corresponding code-generating algorithm for that element from the library of elements 1208. The source code can then be modified by applying that element's code-generating algorithm. Likewise, if a developer makes a change in the code preview tool 1204, such as changing, adding or deleting a particular block of code, the bi-directional conversion module 1206 may act to convert that change to the corresponding visual element. This may include identifying the element corresponding to that block of source code in the library of elements 1208 and then retrieving the algorithms to update the mobile workflow package for that identified element. The algorithms are applied to update the mobile workflow package. Then, the screen design tool 1202 displays an updated or newly added element in the, or in the case of a deleted element, stops displaying the identified element.

Figure 13:
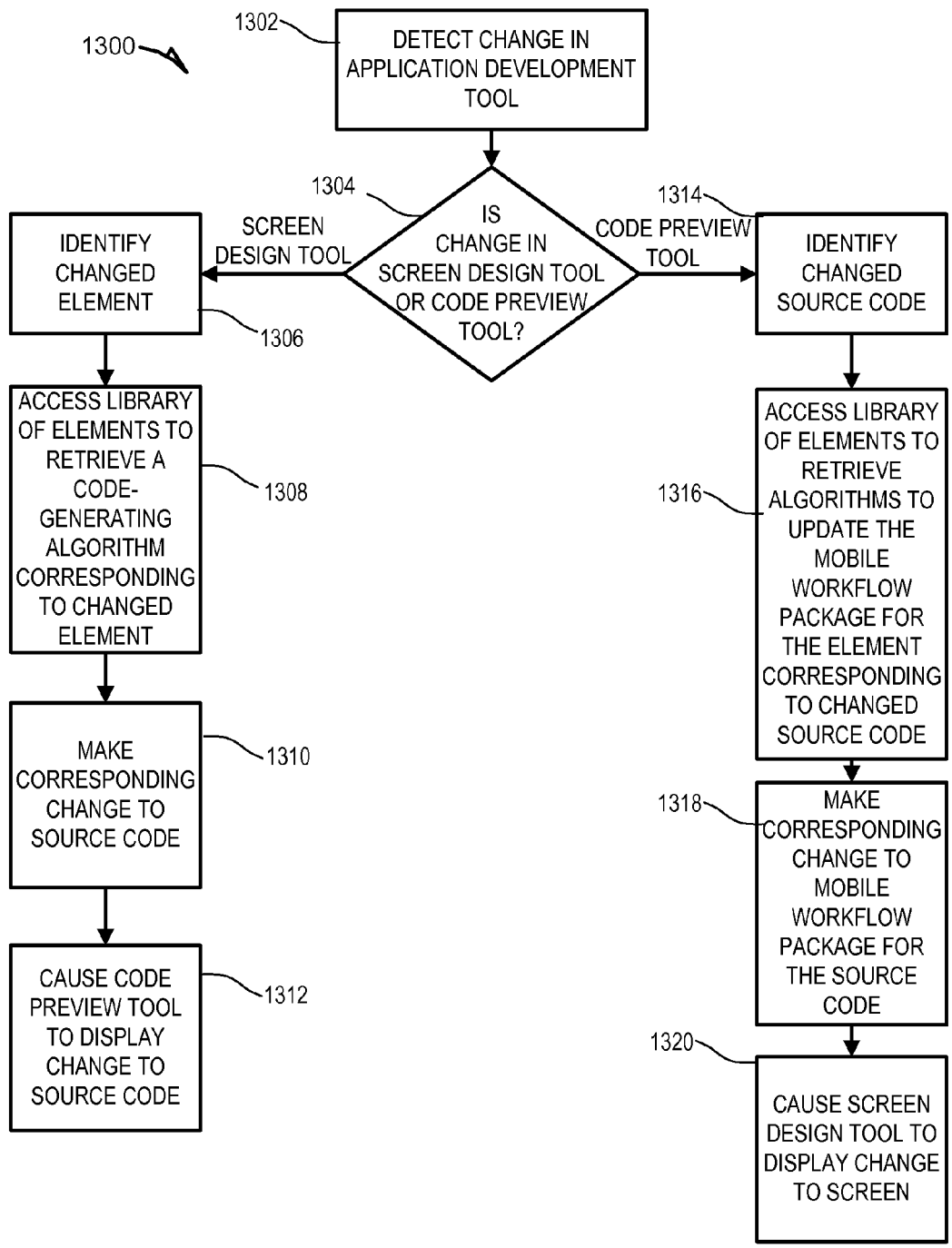
FIG. 13 is a flow diagram illustrating a method of altering a hybrid application in an application development tool in accordance with an example embodiment.

FIG. 13 is a flow diagram illustrating a method 1300 of altering a hybrid application in an application development tool in accordance with an example embodiment. In an example embodiment, the method 1300 may be performed in a bi-directional conversion module, such as the bi-directional conversion module 1206 of FIG. 12. At operation 1302, a change in the application development tool (e.g., application development tool 102 of FIG. 1 or application development tool 1200 of FIG. 12) may be detected. This change may be a change created by a developer using the application development tool. Examples of such changes include alterations of screens in a screen design tool (e.g., screen design tool 1202) by, for example, dragging and dropping new elements onto a screen of the hybrid application, removing elements from the screen of the hybrid application, editing elements' properties, and creating or removing transitions between screens in the hybrid application. Additional examples of such changes include adding, removing, or editing source code, in a code preview tool (e.g., code preview tool 1204), written in a scripting language that can be rendered as a user interface representation.

At operation 1304 it is determined whether the change is in a screen design tool or a page preview tool. If it is determined that the change is in the screen design tool, then at operation 1306 the changed element is identified. At operation 1308, a library of elements (e.g., library of elements 1208) is accessed to retrieve a code-generating algorithm corresponding to the changed element. Thus, if a particular element is added, a code-generating algorithm for that element is obtained from the library of elements. Likewise, if a particular element is edited, a code-generating algorithm for that element is obtained from the library of elements. Likewise, if a particular element is deleted, a code-generating algorithm for that element is obtained from the library of elements. At operation 1310, a corresponding change is made to the source code for the edited screen. This may include accessing the code-generating algorithm corresponding to the element being changed in the screen design tool and adding, editing, or deleting the source code for the element, as appropriate. In the case of an addition of an element, the algorithm corresponding to the element will generate and insert source code for the element and into the screen's source code at an appropriate place. In the case of an editing of an element, the source code corresponding to the prior version of the element may be removed and the code-generating algorithm corresponding to the element will generate and insert source code for the element in its place (or, alternatively, only code relating to the change within the element itself will be changed). In the case of deletion of an element, the source code may be scanned to identify a block of code matching the element, and then that block of code may be removed from the source code. At operation 1312 the code preview tool may be caused to display the changed source code.

If it is determined at operation 1302 that the change is in a code preview tool, then at operation 1314 the changed source code is identified. This may include identifying a block of source code that has been added to the source code, identifying a block of source code that has been modified, or identifying a block of source code that has been deleted from the source code. At operation 1316, a library of elements is accessed to retrieve algorithms to update the mobile workflow package for to the element corresponding to the changed block of source code. Thus, if a particular block of source code is added, algorithms to update the mobile workflow package corresponding to the element that is the subject of the block of source code are obtained from the library of elements. Likewise, if a particular block of source code is modified, algorithms to update the mobile workflow package for the element corresponding to the element that is the subject of the block of source code are obtained. Likewise, if a particular block of source code is deleted, algorithms to update the mobile workflow package corresponding to the element that is the subject of the block of source code are obtained from the library of elements.

At operation 1318, a corresponding change is made to the mobile workflow package for the source code. This may include locating the element (in the case of editing and deleting) corresponding to the source code being edited in the code preview tool and adding a new element, or editing or deleting the element to update the mobile workflow package for the element, as appropriate. In the case of an addition of an element, the algorithms to update the mobile workflow package corresponding to the element is applied to insert the element into the mobile workflow package at an appropriate place. In the case of a deletion of an element, the mobile workflow package may be scanned to identify algorithms to update the mobile workflow package matching the element, and then those algorithms are applied to remove the element from the mobile workflow package. In the case of the editing of an element, the algorithms corresponding to the element are applied to update the mobile workflow package. At operation 1320 the screen design tool may be caused to display the changed screen.

Example Mobile Device

Figure 14:
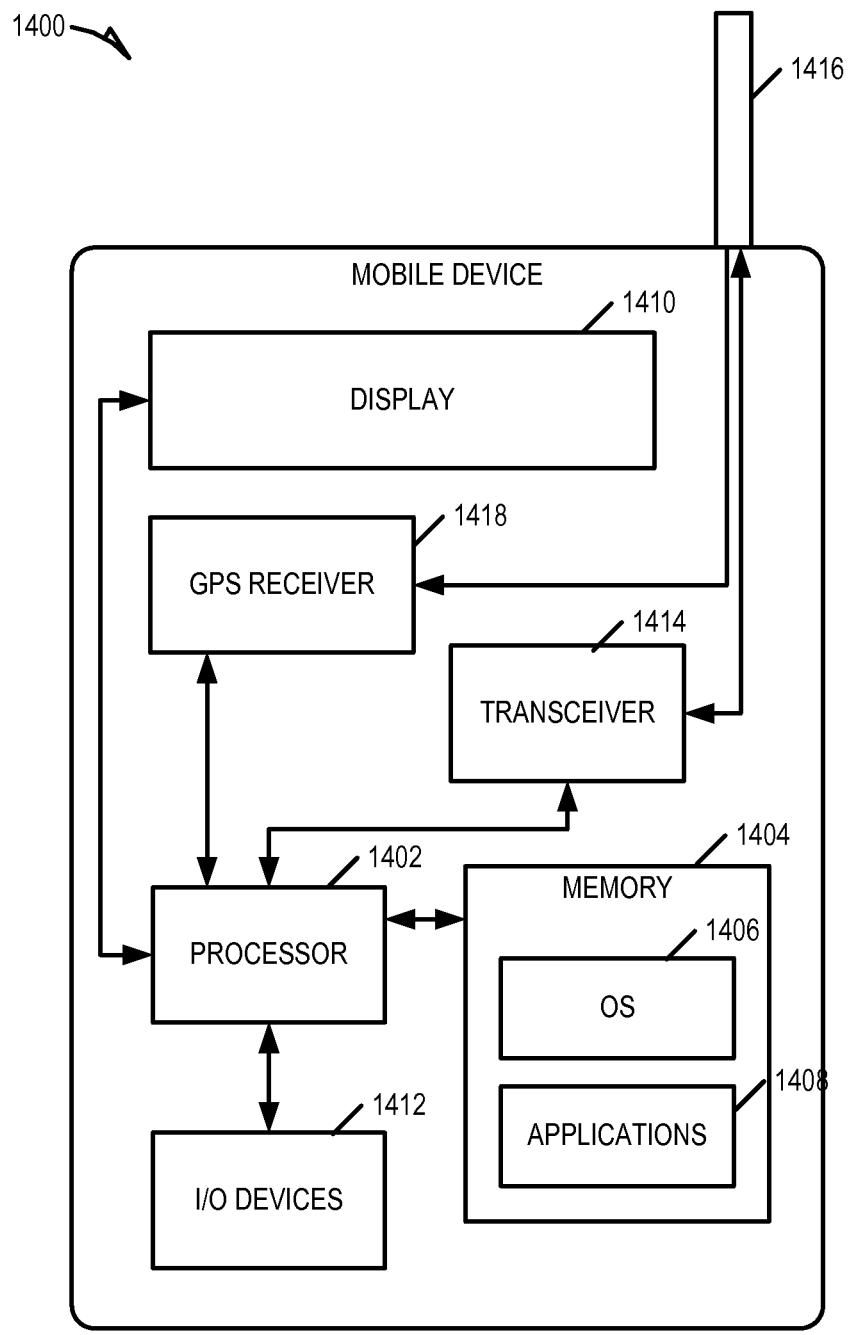
FIG. 14 is a block diagram illustrating a mobile device, according to an example embodiment.

FIG. 14 is a block diagram illustrating a mobile device 1400, according to an example embodiment. The mobile device 1400 may include a processor 1402. The processor 1402 may be any of a variety of different types of commercially available processors 1402 suitable for mobile devices 1400 (for example, an XScale architecture microprocessor, a microprocessor without interlocked pipeline stages (MIPS) architecture processor, or another type of processor 1402). A memory 1404, such as a random access memory (RAM), a flash memory, or other type of memory, is typically accessible to the processor 1402. The memory 1404 may be adapted to store an operating system (OS) 1406, as well as application programs 1408, such as a mobile location enabled application that may provide location-based services to a user. The processor 1402 may be coupled, either directly or via appropriate intermediary hardware, to a display 1410 and to one or more input/output (I/O) devices 1412, such as a keypad, a touch panel sensor, a microphone, and the like. Similarly, in some embodiments, the processor 1402 may be coupled to a transceiver 1414 that interfaces with an antenna 1416. The transceiver 1414 may be configured to both transmit and receive cellular network signals, wireless data signals, or other types of signals via the antenna 1416, depending on the nature of the mobile device 1400. Further, in some configurations, a GPS receiver 1418 may also make use of the antenna 1416 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) of one or more processors (e.g., processor 1402) may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 15:
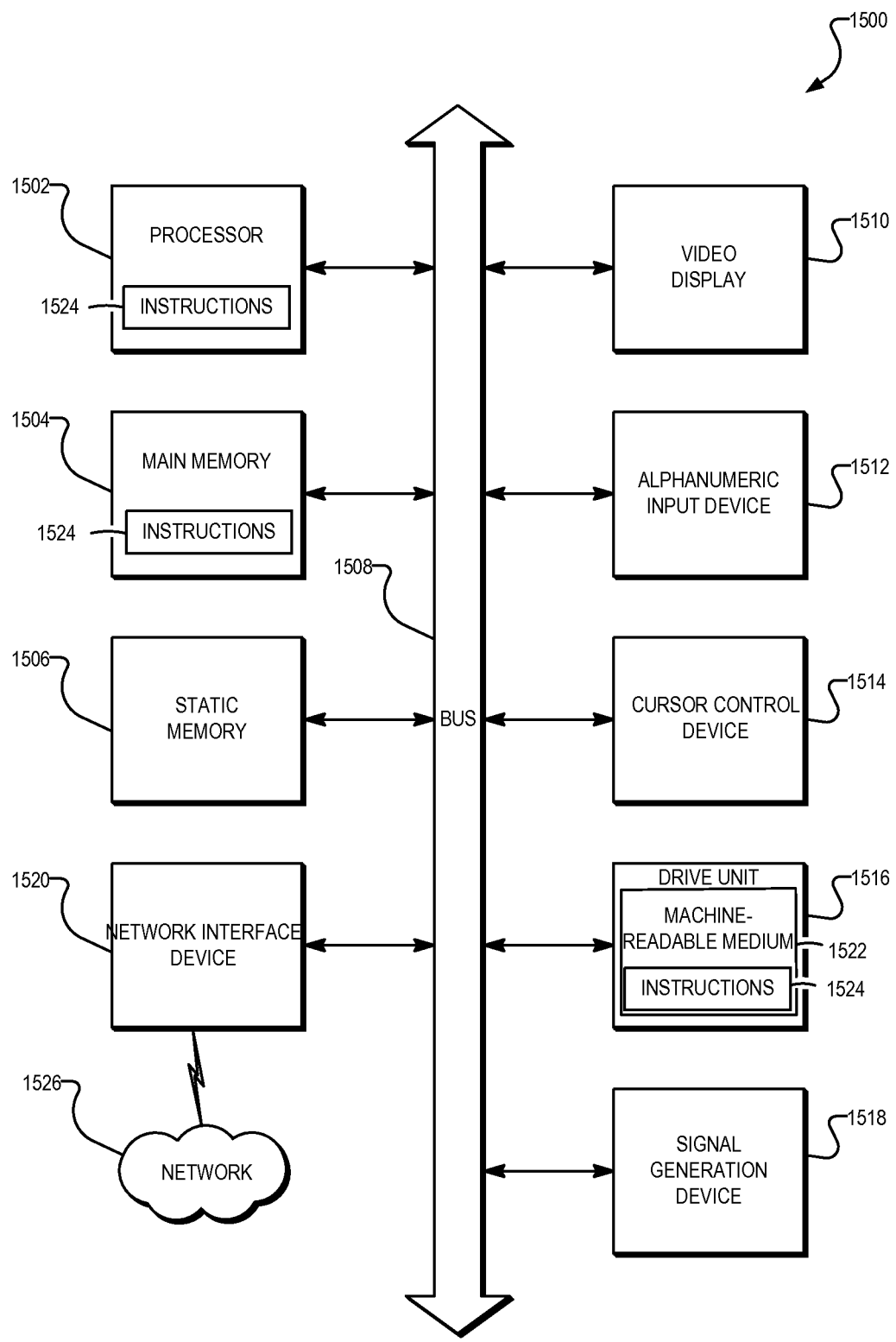
FIG. 15 is a block diagram of machine in the example form of a computer system within which instructions for causing the machine to perform any one or more of the methodologies discussed herein may be executed.

FIG. 15 is a block diagram of machine in the example form of a computer system 1500 within which instructions 1524 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU), or both), a main memory 1504, and a static memory 1506, which communicate with each other via a bus 1508. The computer system 1500 may further include a video display unit 1510 (e.g., a liquid crystal display (LCD) or a cathode ray tube (CRT)). The computer system 1500 also includes an alphanumeric input device 1512 (e.g., a keyboard or a touch-sensitive display screen), a user interface (UI) navigation (or cursor control) device 1514 (e.g., a mouse), a disk drive unit 1516, a signal generation device 1518 (e.g., a speaker), and a network interface device 1520.

Machine-Readable Medium

The disk drive unit 1516 includes a machine-readable medium 1522 on which is stored one or more sets of data structures and instructions 1524 (e.g., software) embodying or utilized by any one or more of the methodologies or functions described herein. The instructions 1524 may also reside, completely or at least partially, within the main memory 1504 and/or within the processor 1502 during execution thereof by the computer system 1500, with the main memory 1504 and the processor 1502 also constituting machine-readable media 1522.

While the machine-readable medium 1522 is shown in an example embodiment to be a single medium, the term "machine-readable medium" may include a single medium or multiple media (e.g., a centralized or distributed database, and/or associated caches and servers) that store the one or more instructions 1524 or data structures. The term "machine-readable medium" shall also be taken to include any tangible medium that is capable of storing, encoding or carrying instructions 1524 for execution by the machine and that cause the machine to perform any one or more of the methodologies of the present disclosure or that is capable of storing, encoding or carrying data structures utilized by or associated with such instructions 1524. The term "machine-readable medium" shall accordingly be taken to include, but not be limited to, solid-state memories, and optical and magnetic media. Specific examples of machine-readable media 1522 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 1524 may further be transmitted or received over a communications network 1526 using a transmission medium. The instructions 1524 may be transmitted using the network interface device 1520 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding or carrying instructions 1524 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
   detecting, in a screen design tool of an application development tool in an enterprise mobility platform, alteration, by a user of the screen design tool, of a first visual element currently displayed in a visual representation of a screen of a hybrid application in the screen design tool;
   accessing, in response to the detecting, a library of elements to retrieve a first code-generating algorithm corresponding to the first visual element;
   executing the first code-generating algorithm, the first code-generating algorithm, when executed, creating a first block of source code written in a scripting language that can be rendered as a user interface representation, the first block of source code designed to cause rendering of the first visual element in response to execution of the first block of source code in an end-user browser application; and
   causing a code preview tool of the application development tool to display source code written in the scripting language, the source code displayed by the code preview tool reflecting the alteration pertaining to the first visual element by the code preview tool adding, changing, or removing the first block of source code to or from a previously displayed version of the source code.

2. The method of claim 1, further comprising:
   detecting a change pertaining to a second element in the source code displayed in the code preview tool, the change corresponding to a deletion, editing, or addition of a second block of source code;
   accessing the library of elements to retrieve information relating to the second element based on the second block of source code; and
   causing the screen design tool to display a visual representation of a screen of the hybrid application reflecting the change pertaining to the second element based on the retrieved information relating to the second element.

3. The method of claim 1, wherein the detecting includes detecting a drag-and-drop operation performed in the screen design tool to drag the first element on to or off of the screen and selecting the first element to edit its properties.

4. The method of claim 1, wherein the first element is a transition between screens of the hybrid application.

5. The method of claim 2, wherein the screen design tool updates an XBW model for the hybrid application.

6. The method of claim 5, further comprising causing a change in the XBW model, the change in the XBW model corresponding to the change pertaining to the second element.

7. The method of claim 1, further comprising creating the hybrid application based on the source code in the code preview tool.

8. The method of claim 7, further comprising downloading the hybrid application into a hybrid web container running on a client mobile device for execution.

9. An application development tool, having a hardware processor, the application development tool comprising:
   a screen design tool executable by one or more processors and configured to:
      graphically display one or more screens of a hybrid application;
   permit a designer to modify the hybrid application by user interaction with one or more elements in a graphical display of the one or more screens;
   a code preview tool executable by the one or more or processors and configured to:
      display source code for the hybrid application;
   permit the designer to modify the source code;
   a library of elements containing identifications of supported elements, corresponding code-generating algorithm for each of the supported elements and algorithms to update the mobile workflow package for each of the supported elements;
   a bi-directional conversion module executable by the one or more processors and configured to:
   detect, in the screen design tool, alteration, by a user of the screen design tool, of a first visual element currently displayed in the graphical display of the one or more screens from the screen design tool;
   access the library of elements to retrieve a first code-generating algorithm corresponding to the first visual element, in response to the detecting;

execute the first code-generating algorithm, the first code-generating algorithm, when executed, creating a first block source code, the first block of source code designed to cause rending of the first visual element in response to execution of the first block of source code in an end-user browser application; and cause the code preview tool to reflect the alteration pertaining to the first element visual by the code preview tool adding, changing or removing the first block of source code corresponding to the first element to or from a previously displayed version of the source code.

10. The application development tool of claim 9, wherein the user interaction with the one or more elements in the graphical display of the one or more screens includes dragging and dropping the one or more elements and selecting the one or more elements to edit their properties.

11. The application development tool of claim 9, if wherein the source code is written in a scripting language that can be rendered as a user interface representation.

12. The application development tool of claim 9, wherein the bi-directional conversion module is further configured to:

detect a change pertaining to a second element in the source code displayed in the code preview tool, the change corresponding to an editing, deletion or addition of a second block of source code;

access the library of elements to retrieve algorithms to update the XBW model element relating to the second element; and cause the screen design tool to graphically display a screen of the hybrid application reflecting the change pertaining to the second element based on the algorithms to update the XBW model for the second element.

13. A non-transitory machine-readable storage medium comprising instructions, which when implemented by one or more machines, cause the one or more machines to perform operations comprising:

detecting, in a screen design tool of an application development tool in an enterprise mobility platform, alteration, by a user of the screen design tool, of a first visual element currently displayed in a visual representation of a screen of a hybrid application in the screen design tool;

accessing, in response to the detecting, a library of elements to retrieve a first code-generating algorithm corresponding to the first visual element;

executing the first code-generating algorithm, the first code-generating algorithm, when executed, creating a first block of source code written in a scripting language that can be rendered as a user interface representation, the first block of source code designed to cause rendering of the first visual element in response to execution of the first block of source code in an end-user browser application; and causing a code preview tool of the application development tool to display source code written in the scripting language, the source code displayed by the code preview tool reflecting the alteration pertaining to the first visual element by the code preview tool adding, changing, or removing the first block of source code to or from a previously displayed version of the source code.

14. The non-transitory machine-readable storage medium of claim 13, further comprising:

detecting a change pertaining to a second element in the source code displayed in the code preview tool, the change corresponding to a deletion, editing, or addition of a second block of source code;

accessing the library of elements to retrieve information relating to the second element based on the second block of source code; and causing the screen design tool to display a visual representation of a screen of the hybrid application reflecting the change pertaining to the second element based on the retrieved information relating to the second element.

15. The non-transitory machine-readable storage medium of claim 13, wherein the first element is a visual element in the screen of the hybrid application.

16. The non-transitory machine-readable storage medium of claim 15, wherein the detecting includes detecting a drag-and-drop operation performed in the screen design tool to drag the first visual element on to or off of the screen and selecting the first element to edit its properties.

17. The non-transitory machine-readable storage medium of claim 13, wherein the first visual element is a transition between screens of the hybrid application.

18. The non-transitory machine-readable storage medium of claim 14, wherein the screen design tool operates an XBW model for the hybrid application.

19. The non-transitory machine-readable storage medium of claim 18, further comprising causing a change in the XBW model, the change in the XBW model corresponding to the change pertaining to the second element.

* * * * *